United States Patent [19]

Louw et al.

[11] Patent Number: 4,919,576

[45] Date of Patent: Apr. 24, 1990

[54] LOCKING APPARATUS FOR BLIND FASTENERS

[75] Inventors: John A. Louw, Temecula; William H. Owens, Fontana; Ralph Luhm, La Habra, all of Calif.

[73] Assignee: Allfast Fastening Systems, Inc., Industry, Calif.

[21] Appl. No.: 148,678

[22] Filed: Jan. 26, 1988

Related U.S. Application Data

[63] Continuation-in-part of Ser. No. 56,067, Jun. 1, 1987, abandoned, which is a continuation of Ser. No. 766,039, Aug. 16, 1985, abandoned, which is a continuation-in-part of Ser. No. 646,766, Sep. 4, 1984, abandoned.

[51] Int. Cl.$^5$ .............................................. F16B 13/04
[52] U.S. Cl. ..................................... 411/34; 411/43
[58] Field of Search ................... 411/34, 43, 39, 40, 411/41, 10, 17, 18, 22, 23, 44, 45, 46, 56, 55, 70, 360, 341

[56] References Cited

U.S. PATENT DOCUMENTS

| | | | |
|---|---|---|---|
| Re. 20,055 | 8/1936 | Huck | 411/43 X |
| 2,195,029 | 3/1940 | Hathorn | 411/34 |
| 2,545,752 | 3/1951 | Singleton | 411/43 |
| 3,073,205 | 1/1963 | Siebol | 411/43 |
| 3,236,143 | 2/1966 | Wing | 411/34 |
| 3,377,907 | 4/1968 | Hurd | 411/70 |
| 3,560,124 | 2/1971 | Bergere | 411/361 |
| 3,641,865 | 2/1972 | Swindt et al. | 411/361 |
| 4,012,984 | 3/1977 | Matuschek | 411/34 |
| 4,143,580 | 3/1979 | Luhm | 411/45 |
| 4,177,710 | 12/1979 | Matuschek et al. | 411/34 |
| 4,230,017 | 10/1980 | Angelsanto | 411/34 |
| 4,246,828 | 1/1981 | Tamashiro | 411/45 |
| 4,407,619 | 10/1983 | Siebol | 411/43 |
| 4,432,679 | 2/1984 | Angelosanto et al. | 411/70 X |
| 4,451,189 | 5/1984 | Pratt | 411/34 |
| 4,473,914 | 10/1984 | Haft | 411/43 X |
| 4,615,655 | 10/1986 | Dixon | 411/43 X |
| 4,678,384 | 7/1987 | Sparling et al. | 411/45 X |

FOREIGN PATENT DOCUMENTS

| | | | |
|---|---|---|---|
| 2016106 | 9/1979 | United Kingdom | 411/42 |
| 2159595 | 12/1985 | United Kingdom | 411/34 |
| 86/05560 | 9/1986 | World Int. Prop. O. | 411/34 |

*Primary Examiner*—Rodney M. Lindsey
*Attorney, Agent, or Firm*—Blakely, Sokoloff, Taylor & Zafman

[57] ABSTRACT

A locking apparatus for blind fasteners providing improved yield and fatigue performance of the blind fasteners is disclosed. The locking apparatus utilizes a locking collar which will slide over the fastener stem and within the tubular rivet sleeve of the fastener without preforming into the locking groove on the stem. The locking collar is formed so that upon the pulling of the stem during installation of the blind fastener, specially formed tapered regions in the locking collar then adjacent the locking groove on the stem cause the region of the locking collar immediately thereabove to be encouraged tightly inward against the locking groove to provide a particularly tight fit in the locking groove. In an alternate embodiment, the locking collar is formed so that upon pulling of the stem during installation of the blind fastener, a specially formed locking collar buckles inward to pack tightly into the locking groove.

28 Claims, 5 Drawing Sheets

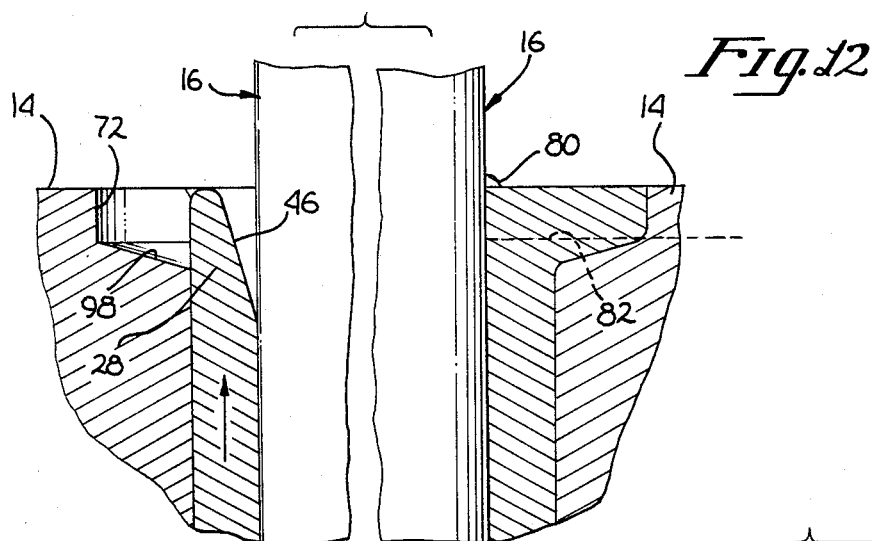
Fig.12
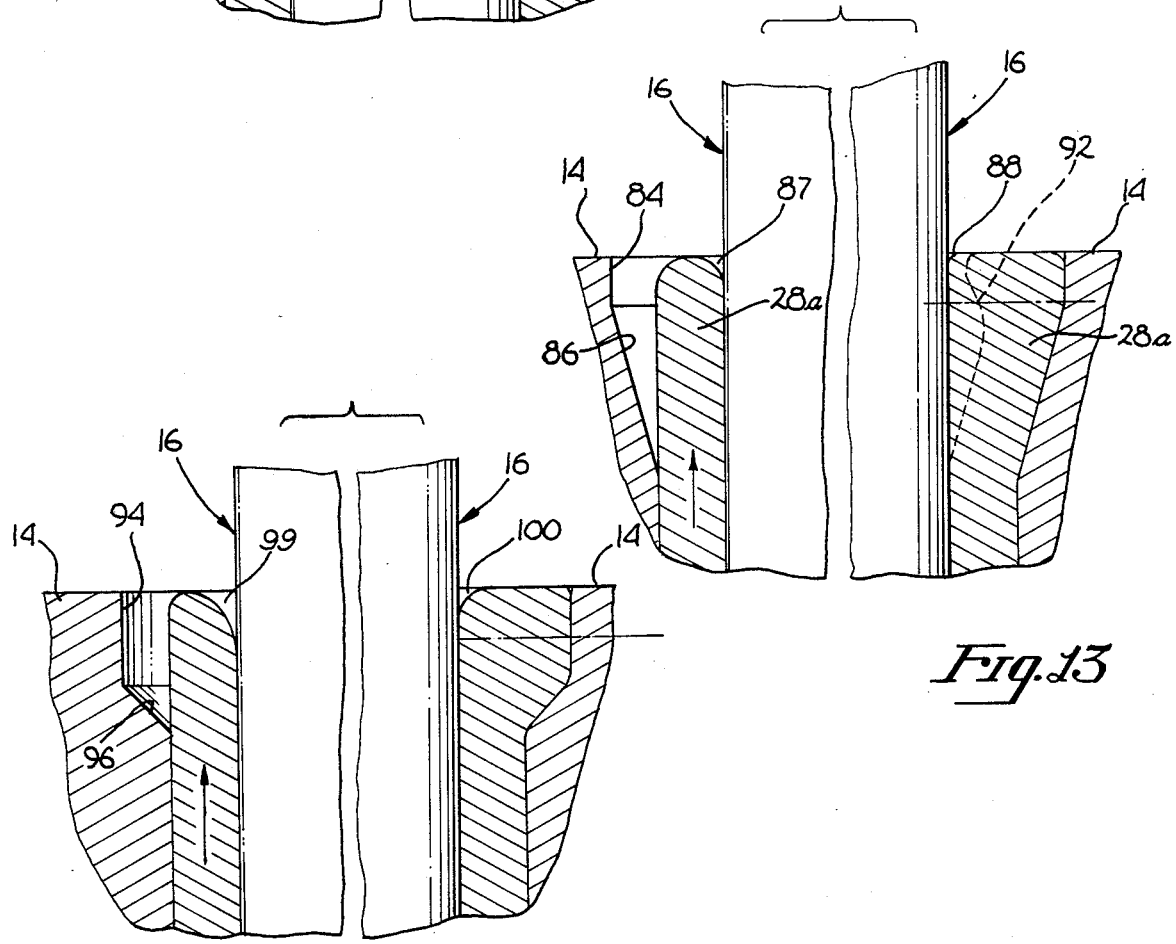
Fig.13
Fig.14

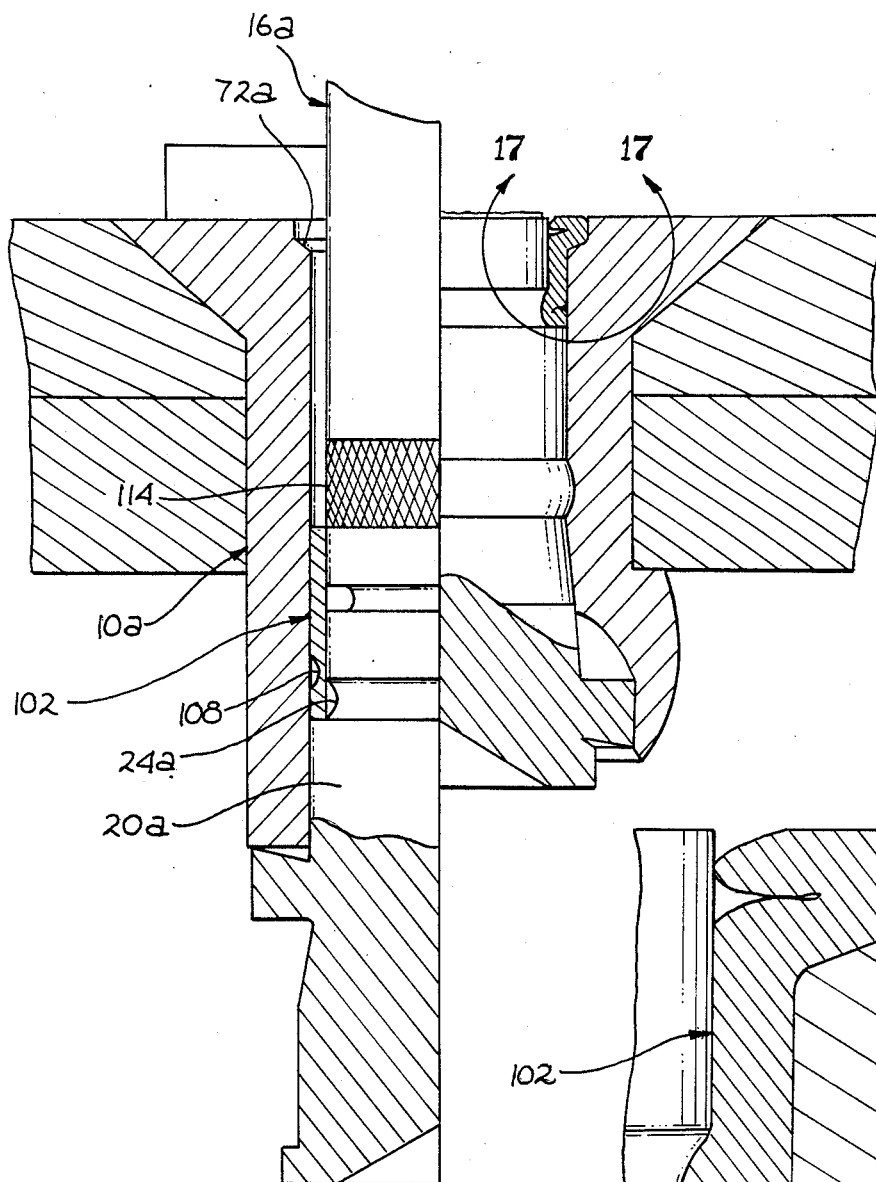
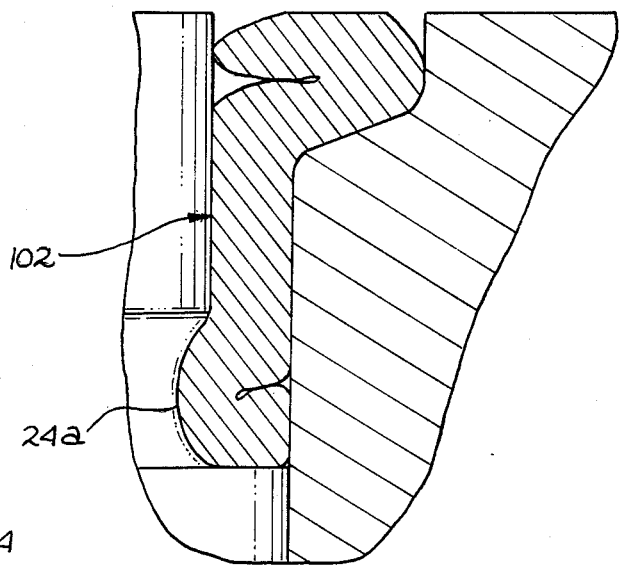
Fig. 16
Fig. 17
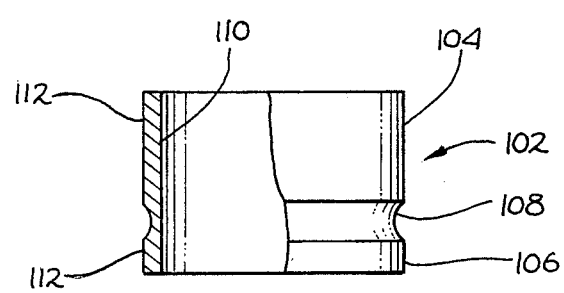
Fig. 15

LOCKING APPARATUS FOR BLIND FASTENERS

This application is a continuation-in-part of patent application Ser. No. 07/056,067 filed on 6/1/87 now abandoned, which application is a continuation of patent application Ser. No. 06/766,039 filed on 8/16/85 now abandoned, which is a continuation-in-part of patent application Ser. No. 06/646,766 filed on 9/4/84 now abandoned.

BACKGROUND OF THE INVENTION

1. Field of the Invention.

The present invention relates to the field of blind fasteners, and more particularly to blind fasteners of high strength and high fatigue life as are used in aircraft manufacture and the like.

2. Prior Art.

The present invention comprises an improvement to the Blind Rivet Assembly with Locking collar and Rivet Stem disclosed in U.S. Pat. No. 4,012,984. That patent discloses a blind rivet assembly having a blind rivet stem extending through a hollow rivet so that it may be pulled, thereby to expand the tail of the hollow rivet. A collar on the stem has a head fitting in a locking groove within the grip length of the stem so that when the tail of the collar abuts a pressure element bearing against the head of the hollow rivet, it is bulged outwardly into a recess in the rivet head, thereby to interlock the rivet stem in the hollow rivet. A weakened portion, such as a break groove, is provided on the stem adjacent the bulged end of the collar whereby upon further pulling, the rivet stem breaks at the weakened portion, leaving the remaining part of the blind rivet assembly in the workpiece.

Such a blind rivet assembly has found substantial uses in aircraft construction and other applications. However, the design and operation of the locking collar of such blind rivets have certain characteristics which may result in loose stems upon installation or after some period of use, and which may result in the installed fastener exhibiting less than its full strength and fatigue life potential. In particular, the locking collar must fit within the locking groove and rivet sleeve for all combinations of tolerances of parts, with the worst combination being the largest allowable locking groove and the smallest allowable locking collar. Consequently, the locking collar will fit slightly loosely within the locking groove for all other combinations of dimensions, even when the parts are right on the nominal dimensions. Thus on installation of the blind rivet, the locking collar is forced toward the tail of the rivet sleeve, to the extent it has clearance with respect to the locking groove, so that the stem of the installed rivet may move slightly toward the rivet tail under conditions of high stress or vibration, thereby reducing the strength and fatigue resistance of the rivet. Further, because the skirt of the locking collar is effectively formed on installation by the buckling of the upper skirt portion of the locking collar, the folding or buckling action of the skirt necessitates a rather deep recess in the sleeve head. This results in an overlap between this recess and the locking groove of the mandrel. The result is that the whole lock ring may get squeezed out of its pocket when a downward load is applied to the stem, so that after a very short travel, the stem is completely loose.

The invention disclosed and described herein consists of embodiments thereof of Messrs John August Louw and William Howard Owens, disclosed and claimed in the patent application and already assigned to Allfast Fastening Systems, Inc., and an embodiment of Ralph Luhm.

BRIEF SUMMARY OF THE INVENTION

Locking apparatus for blind fasteners providing improved yield and fatigue performance of the blind fasteners is disclosed. The locking apparatus utilizes a locking collar which will slide over the fastener stem and within the tubular rivet sleeve of the fastener without preforming into the locking groove on the stem. In one form, the locking collar is formed so that upon the pulling of the stem during installation of the blind fastener, specially formed tapered reliefs in the locking collar then adjacent the locking groove on the stem cause the region of the locking collar immediately thereabove to be forced tightly inward against the locking groove to provide a particularly tight fit in the locking groove. At the same time, a specially tapered top end of the locking collar is flared outward into the recess in the fastener head, and the tubular shank is expanded in compression to take up any clearances thereabout, all of the foregoing occurring before the breaking of the pulling portion of the stem occurs. The net result is that the flared portion of the locking collar fits tightly in the recess, the other end of the locking collar fits tightly in the locking groove and the cylindrical portion therebetween fits tightly on the adjacent portion of the stem and tightly within the adjacent portion of the rivet sleeve, independent of reasonable variations in the dimensions of the various components of the blind fastener within the dimensional tolerances of such components. In an alternate embodiment, the locking collar is formed so that upon pulling of the stem during installation of the blind fastener, a specially formed locking collar buckles inward to pack tightly into the locking groove. Also, alternate forms of the top end of the locking collar and in the recess in the fastener head particularly suited for use in fasteners wherein fastener head material will be removed after installation for surface smoothing purposes are disclosed, though a conventional fastener head recess and locking collar head end may be used as desired.

BRIEF DESCRIPTION OF THE DRAWINGS

FIG. 12 is a schematic cross section of the top of the locking collar of the embodiment of FIGS. 1 through 6 and 10 before and after pulling, taken on an expanded scale.

FIG. 13 is a schematic cross section of the top of an alternate embodiment locking collar before and after pulling.

FIG. 14 is a schematic cross section of the top of a still further alternate embodiment locking collar before and after pulling.

FIG. 15 is a side view taken in partial cross section of a still further alternate locking collar of the present invention.

FIG. 16 is a partial cross section of the rivet of the present invention utilizing the locking collar of FIG. 15 and illustrating on the left side of the center line the rivet prior to pulling and on the right side of the center line the rivet after pulling.

FIG. 17 is a view taken on an expanded scale along line 17—17 of FIG. 16.

DETAILED DESCRIPTION OF THE INVENTION

Figure 1:
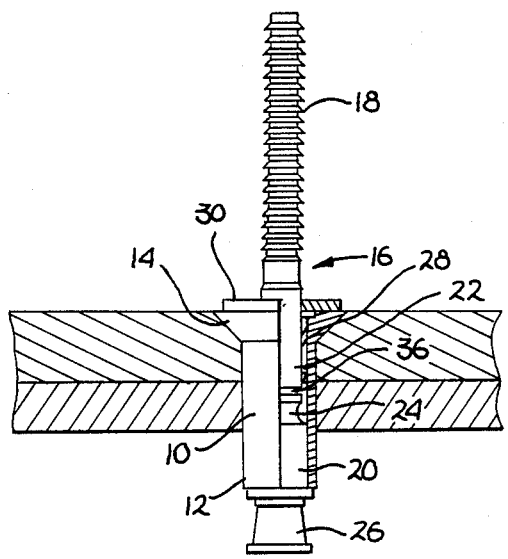
FIG. 1 is a cross section, partially cut away, of the rivet of the present invention as inserted but prior to pulling.
Figure 2:
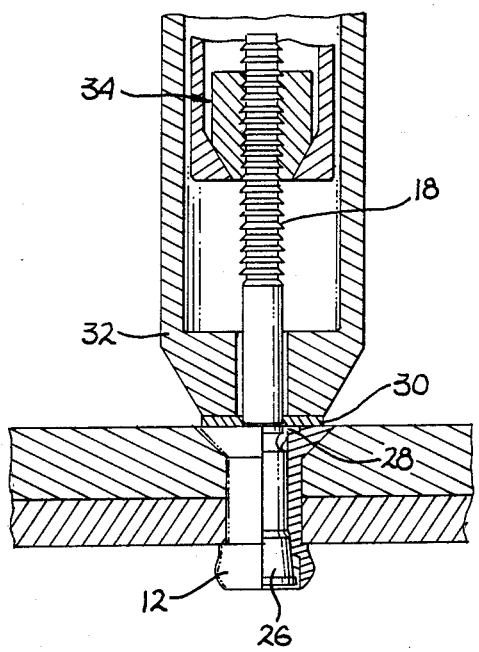
FIG. 2 is a view similar to FIG. 1 after pulling and immediately prior to the breaking of the pulling portion of the stem from the stem in the installed rivet.

First referring to FIGS. 1 and 2, a blind rivet assembly inserted in an appropriate hole through two plates to be joined prior to pulling and during pulling, respectively, may be seen. The major parts of the rivet, for purposes of identification, comprise the tubular rivet sleeve 10 having an expandable sleeve tail 12 and preformed head 14, with a stem, generally indicated by the numeral 16, passing therethrough. The stem has a pulling portion 18, a plug portion 20 basically conforming to the inner diameter of the rivet sleeve 10, a smaller diameter portion 22 thereabove, a locking groove 24 between the plug portion 20 and the smaller diameter region 22, and a tail former 26 at the lower end thereof. These various parts of the blind rivet assembly in the present invention are generally in accordance with the corresponding parts of U.S. Pat. No. 4,012,984, though in certain instances they will be of different proportions in accordance with the present invention. In addition to these various parts, the present invention includes a locking collar 28 of particularly unique design, which in cooperation with the various other elements of the blind rivet assembly, provides an improved locking action for the stem of the installed rivet, helping to eliminate the occurrence of any looseness in the installed rivet and improving the stress and fatigue capabilities of the rivet. Finally, in the embodiment disclosed, a pressure washer 30 is used which, as shall be subsequently seen, acts as an anvil during pulling, against which the head of the locking collar is formed. Other embodiments do not use the pressure washer, the same function being achieved by the abutting face of the pulling tool.

Figure 3:
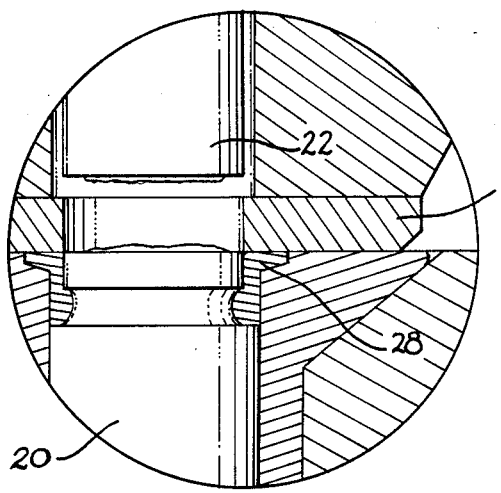
FIG. 3 is a partial cross section taken on an expanded scale illustrating the breaking away of the pulling portion of the rivet stem.

FIG. 2 illustrates the rivet of FIG. 1 during pulling. The pulling tool generally comprises a pressure element 32 through which the pulling portion 18 of the stem will pass so that the pressure element may rest flat against the pressure washer 30. The pulling tool also has a chuck-like portion, generally indicated by the numeral 34, which engages the pulling portion 18 of the stem, and through a mechanism not shown will pull the pulling portion of the stem along its axis until the sleeve tail 12 is expanded by the tail former 26 and the locking collar 28 is formed to lock the stem at the pulled position, after which the pulling portion 18 of the stem will break from the lower portion of the stem as shown in FIG. 3 by the failure of the stem in tension at the break groove 36 (see FIG. 1) in the stem provided to define a weakend region therein.

Figure 4:
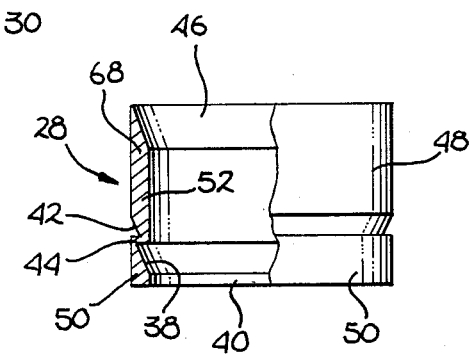
FIG. 4 is a side view taken in partial cross section of the locking collar of the present invention.

The locking collar 28 of this embodiment of the present invention may be seen in FIG. 4, which is a side view, partially cut away to also illustrate a cross section thereof. As may be seen in the figure, the locking collar of this embodiment is a generally tubular member specially formed in three regions. In particular, adjacent the lower end thereof is internal taper 38 just above a short tubular section 40. Cooperatively disposed with the internal tapered region 38 is an external tapered region 42, the upper portion 48 and the lower portion 50 of the locking collar being connected between the two tapered regions by section 44. Finally, the top of the locking collar 28 has an internal tapered region 46 extending outward at the top of the locking collar to at least a substantial part of the wall thickness of the basic tubular shape of the locking collar.

Figure 5:
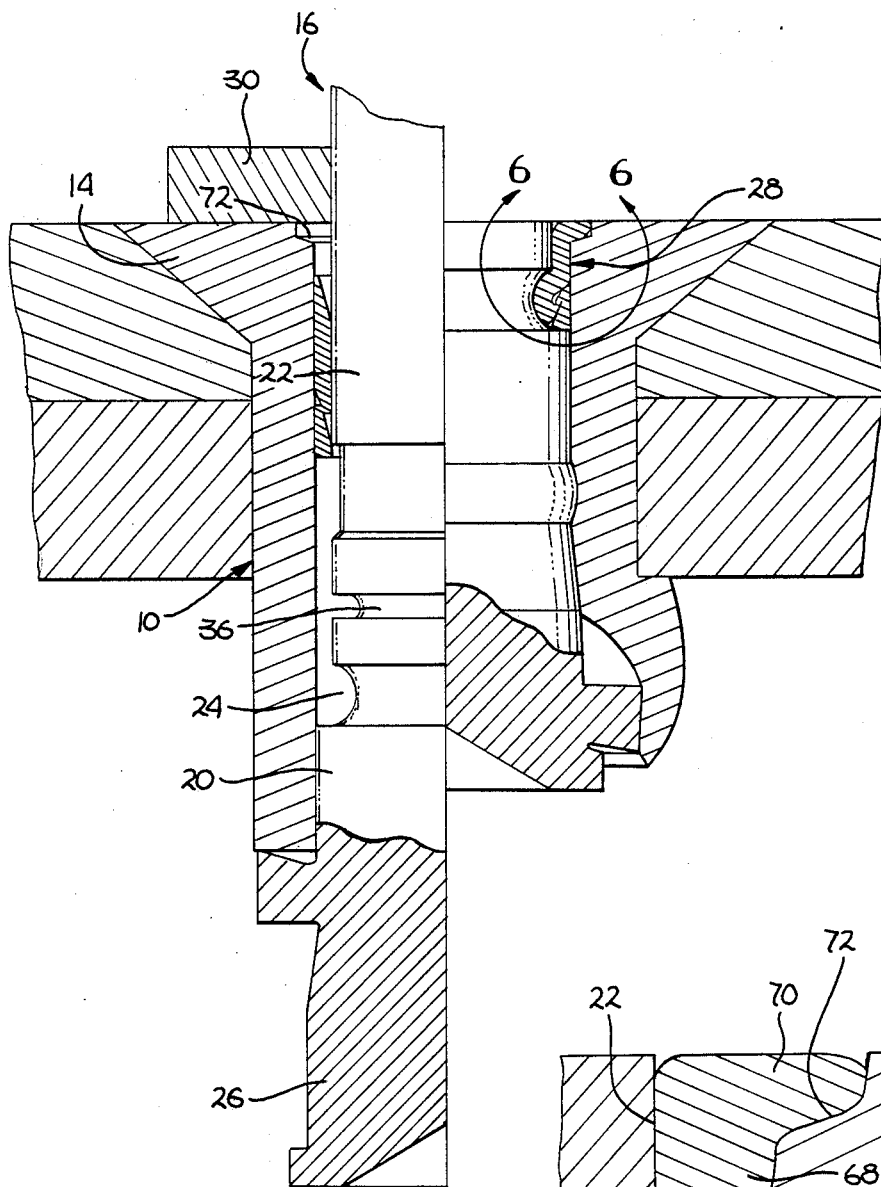
FIG. 5 is a partial cross section of the rivet of the present invention illustrating on the left side of the center line the rivet prior to pulling and on the right side of the center line the rivet after pulling.

Now referring to FIG. 5, an illustration showing at one side of the center line the various parts of the blind rivet before pulling, and on the other side of the center line the rivet after pulling, may be seen. As may be seen at the left side of the figure, the locking collar 28 may be located anywhere along the rivet stem between the plug portion 20 and the pressure washer 30, as unlike the prior art, the locking collar is not preformed onto the stem and more particularly into the locking groove in any way. Thus, obviously though assembly of the various parts is required, a preforming step onto the stem is not.

Figure 6:
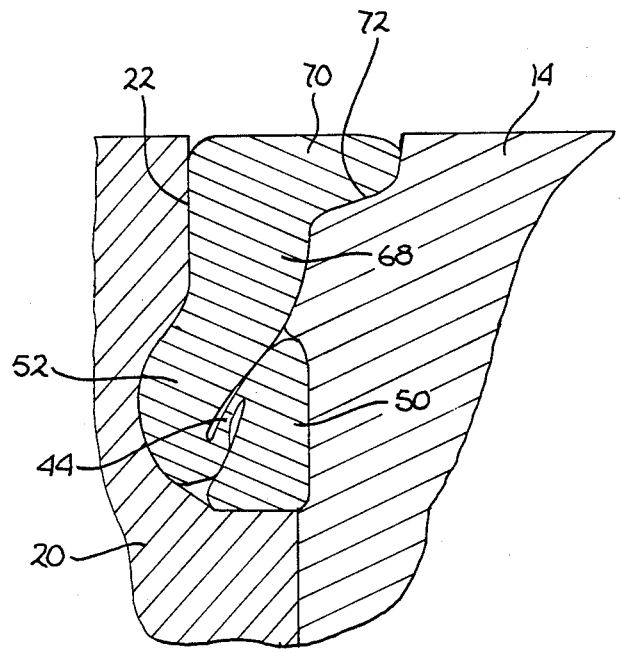
FIG. 6 is a view taken on an expanded scale along line 6—6 of FIG. 5.
Figure 7:
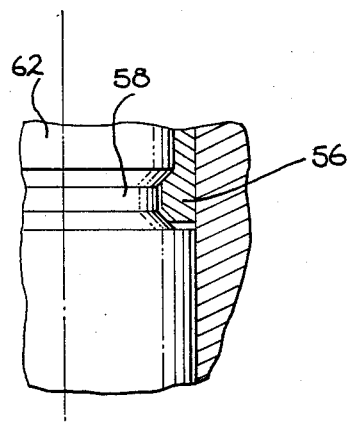
FIGS. 7 through 9 and 11 are views illustrating various characteristics of a prior art locking collar.
Figure 8:
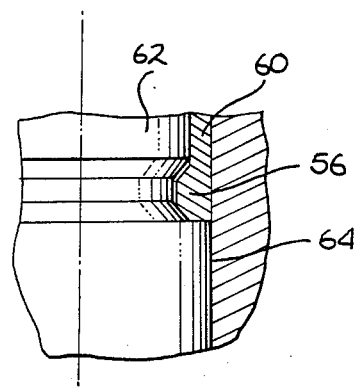
Figure 9:
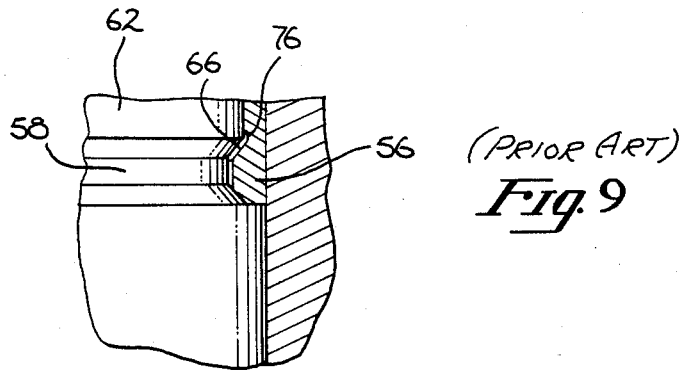
Figure 11:
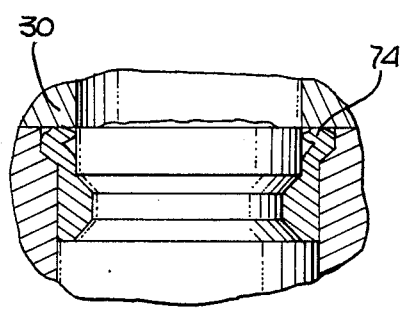

Upon pulling of the rivet, a number of things happen to the locking collar to provide the improved locking action of this embodiment. In particular, the locking collar 28 after pulling may be seen in the right hand portion of FIG. 5, with the relevant portion of such figure being shown on an expanded scale in FIG. 6. As is best shown in FIG. 6, it may be seen that the lower portion 50 has been forced downward firmly against the plug portion 20 so as to eliminate any clearance therebetween. The region 44 joining the lower portion 50 and the upper portion 48 of the locking collar (FIG. 4) has been greatly distorted, and in fact may partially or totally fracture without consequence. The tapered upper region of the lower portion 50 of the locking collar has in effect formed an inclined plane, cooperating with the outer tapered region 42 of the locking collar 28 to force the lower region 52 of the locking collar to deform inward to substantially totally fill the locking groove in the rivet stem independent of the exact dimensions of the various parts within the allowed range of tolerances. Of particular importance is the fact that the locking collar wedges tightly against the upper region of the locking groove, thereby avoiding any clearance therebetween in the set rivet. This is to be compared with the prior art locking collar as illustrated in FIGS. 7, 8 and 9. In particular, as previously pointed out the head 56 of the prior art locking collar nominally will have some looseness in the locking groove 58 on the stem of the rivet. Even if the head of the locking collar is formed at the top of the locking groove as illustrated in FIG. 7, the locking collar and head will move to the bottom of the locking groove as a result of the pressure on the top of the locking collar by the pressure washer, or by the pulling tool if no pressure washer is used. In general, during pulling the tubular portion 60 of the locking collar will yield in compression to take up any clearance between the smaller diameter 62 of the rivet stem and the inner diameter 64 of the rivet sleeve. However, because the head 56 of the locking collar is of greater cross sectional area than the tubular portion 60, the head will not yield in compression to entirely fill the locking groove, so that the clearance between head 56 and locking groove 58, wherever such clearance was originally located, will be positioned just above the head 56 as clearance 66 illustrated in FIG. 9. This position of the clearance is the worst possible position of such clearance in an installed rivet, as some downward motion of the stem can occur without requiring any yielding or distortion of the set locking collar.

In the present invention, on the other hand, it may be seen from the various figures, particularly FIGS. 4 and 6, that the locking collar of the present invention does not have any regions of enlarged cross section such as the head 56 of FIGS. 7 through 9, but in fact because of the tapered regions 42 and 38, the regions of the locking collar which are formed into the locking groove are in effect the same or lesser thickness than the tubular region 68 of the locking collar. Accordingly, the portions of the locking collar in the regions of the locking groove readily deform and yield in compression to assure very tight filling of the locking groove, independent of the particular dimensions of the various parts within the allowed tolerance range. In that regard, FIG. 6 is a drawing accurately illustrating on an expanded scale, the cross section of the locking collar and adjacent regions of the rivet after pulling.

Figure 10:
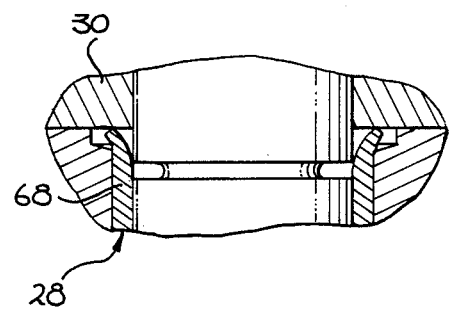
FIG. 10 is a view illustrating the flaring of the top of the locking collar of the present invention during pulling.

A second thing which occurs during pulling is that the top of the locking collar 28 flares outward as a result of the tapered region 46 (FIG. 4) of the locking collar. In particular, the pressure washer 30 engages the top of the taper, which top is at or toward the outside diameter of the cylindrical region 68 of the locking collar. The result is that the compressive stresses adjacent the top of the locking collar during formation are highest adjacent the outside diameter of the locking collar, inducing compressive yielding in that region first to result in the flaring of the top of the locking collar as illustrated in FIG. 10 to form the flared top 70 of the locking collar to lock the locking collar in the recess 72 of the preformed head 14 of the rivet. In comparison, in the prior art locking collar, the top 74 of the locking collar is forced to buckle to serve the same function, thereby requiring a bigger and particularly a deeper recess in the head of the rivet, which frequently results in an overlap between that recess and the locking groove of the mandrel. Such an overlap is undesirable, the occurrence of such buckling outward tending to roll the top of the head of the locking collar out of the locking groove in the stem, further increasing any clearance in that region. Finally, the third thing which occurs during the setting of the rivet is that the tubular portion 68 (FIG. 6) of the locking collar yields in compression to fully fill any clearance between the smaller diameter portion 22 of the stem and the adjacent inside diameter of the rivet sleeve head 14. This is illustrated in FIG. 6, wherein it may be seen that region 68 is tightly forced into such gap, the figure illustrating some degree of distortion in the sleeve head 14 caused by the very tight filling of the various gaps by the locking collar during setting. The degree of distortion is a function of the yield strengths of the materials utilized. With the locking groove filled, the cylindrical portion of the locking collar expanded to remove all clearance between the stem and the sleeve in that region and to expand the sleeve in the hole in the material to be joined, and the top of the locking collar flared to fill the recess in the head, no further distortion of the locking collar can occur. This is to be compared with the prior art locking collar as illustrated in FIG. 9. In particular, during setting the hoop strength of the head 56 of the locking collar prevents a corresponding yield in compression of the cylindrical region immediately adjacent thereto, so that a small underfill 76 occurs in that region. Finally, rivet stem movement ceases, resulting in the breaking of the pulling portion from the stem of the installed rivet.

For a blind rivet assembly to have maximum strength and fatigue resistance when installed, it is essential that the rivet be tightly installed to force the two or more panels being joined in to tight face-to-face abutment, and that all clearances between the various internal parts of the rivet and the inner diameter of the sleeve be eliminated to the maximum extent possible. In particular, it is obvious that the rivet sleeve must be somewhat malleable for the sleeve to be somewhat expanded to fill the hole in the parts to be joined and for the tail of the sleeve to be properly expanded by the tail former. Consequently it is particularly important that the entire inner diameter of the rivet sleeve be supported internally by tight fitting parts and/or parts compressively distorted thereinto, as any clearance between the rivet sleeve and the stem would allow the rivet sleeve to distort in use under load, reducing the strength and fatigue life of the assembly. It is of course also important that the stem of the installed rivet be as positively locked in the set position as possible, as failure to so lock the stem may allow the stem to move in the direction of the tail of the rivet upon the shock of the breaking of the stem, or subsequently in use of the rivet, reducing the support for and thus the strength of the sleeve and tail of the installed rivet.

Thus, it may be seen that the present invention locking collar provides optimum filling of the locking groove in the stem, independent of part dimensions, assures uniform compressive deformation of the locking collar in the tubular portion thereof to assure tight filling of the respective region between the stem and the sleeve (and to help expand the sleeve) and provides a definite and positive flaring of the top of the locking collar into a recess in the head of the sleeve of minimum size, all to provide a blind rivet assembly of the highest strength and fatigue resistance.

Referring again to FIG. 4 and FIG. 6, it will be apparent that the upper portion 48 and the lower portion 50 of the locking collar 28 substantially separate into two pieces upon pulling of the rivet, and accordingly could be fabricated and assembled as two pieces if desired. Such is not preferred however, as to do so would require the handling of additional parts and would provide the opportunity to get one or both parts into the assembled rivet upside down so as not to properly function as described herein. Also, in theory the lower portion 50 of the locking collar, not distorting significantly during pulling, could be formed as the upper portion of the plug portion 22 of the stem, though again such is not preferred as to do so would in effect require the formation of a locking groove generally conforming to the lower part 52 of the installed collar (see FIG. 6), a difficult locking groove to both fabricate and inspect. Also, it should be noted that while the taper 46 at the top of the locking collar of FIG. 4 is shown as encompassing most of the diameter of the locking collar so as to define a relatively thin section ring at the top of the locking collar, the extent of this taper can be varied as desired in relation to the various other dimensions and proportions of the various parts making up the rivet, as the flaring will generally occur providing the taper is of at least some substantial extent, and preferably is of at least 50% of the thickness of the cylindrical section 68. Further, while it is preferred to have the diameter of the bottom of the tapered region 42 be smaller than the diameter at the top of tapered region 38 so that the tapered regions themselves will engage as inclined planes upon distortion of section 44, such is not an absolute requirement, as the desired action will occur so long as these two diameters are at least approximately equal.

In the previously described embodiment there may be either of two occurrences which are less than ideal. Both of these occurrences are illustrated in FIG. 12, which is an enlarged view of the top of the locking collar and the recess in the head of the fastener, the left side of the figure illustrating the parts before pulling and the right side illustrating the parts after pulling. As stated before, the tapered region 46 encourages the flaring of the top of the locking collar, with a very good tight filling of the recess 72 in the head of the rivet as a result thereof. Because the filling normally is so tight and complete, and probably for the further reason that filling occurs without that much cold working of the material adjacent the top inner diameter of the flare, some locking collar material 80 may tend to extrude into the region between the outer diameter of stem 16 and the inner diameter of the anvil washer 30 (see FIGS. 2 and 3) during pulling. This in turn may result in an otherwise unnecessary increase in the roughness across the head of the installed rivet.

The second condition which is sometimes encountered is a result of the shaving of the head of installed fasteners, sometimes done to provide an especially smooth aerodynamic surface across the top of the installed fasteners, and to assure that the surface of the installed fastener is flush with the surface of the adjacent material. In particular, though the amount of material removed from the head will in any event be relatively limited, in the upper limit the head may be shaved to a level approximately equal to the level indicated by the dashed line 82 in FIG. 12. It may be seen therein that this extent of shaving will remove a substantial portion of the flare, leaving such a small portion of the flare as to appear to substantially weaken the effective retention of the stem by the locking collar. In practice it has been found that unshaved fasteners in accordance with the present invention are substantially stronger in this respect than prior art fasteners, and that while the shaving does slightly reduce the strength of the fastener, the strength of the shaved fastener still equals or exceeds that of the prior art devices. However, while one may reasonably expect some loss of strength to be incurred in the shaving process, it is of course highly desirable to minimize that loss of strength, both in terms of actual physical measurements, and in terms of visual appearance of the installed and shaved fastener, or installed, pulled and sectioned test fasteners.

One approach to substantially eliminate the foregoing occurrences is shown in FIG. 13. In this modified head design, the cylindrical recess 84 is approximately the same depth or perhaps even shallower than the depth of the cylindrical recess portion of recess 72 of the earlier design. Also, the cylindrical recess 84 is of generally smaller diameter than the diameter of the cylindrical portion of recess 72 of the earlier design, though the tapered region 86 is a much deeper taper than before. Further, the top 87 of the locking collar 28a is generally symmetrically rounded so that the pressure thereon during forming of the head is essentially distributed over a ring or annulus substantially midway between the inner and outer diameter thereof. This in turn discourages flaring of the top of the locking collar but instead induces compressive yielding or upsetting of the locking collar on pulling, as is illustrated in the right hand portion of FIG. 13.

The net result of this embodiment is that the relatively deep taper 86 of the tapered portion of the fastener head recess and the firm filling thereof by the upsetting of the top of the locking collar 28a assures that there will be a more than adequate amount of formed locking collar material in the recess for locking purposes even after any reasonable amount of material is shaved from the head of the rivet after pulling. Also, the relief 86 adjacent the inner diameter of the locking collar prior to pulling, formed by the radius on the top of the locking collar shown in FIG. 13, a chamfer or otherwise, allows for substantial material flow in that region without extruding outward between the stem and the anvil washer, resulting in the substantial filling of the relieved area upon pulling, as shown as 88 in FIG. 13, without any extrusion of material into the region between the inner diameter of the anvil washer and the stem.

The embodiment of FIG. 13 achieves the desired result of eliminating the extrusion of any locking collar material between the anvil washer and the stem, and assures sufficient depth in the formed top of the locking collar after pulling so as to eliminate any appearance of significant weakening of the lock after shaving. However, the relatively long tapered region 86, together with the fact that the forming force on the top of the locking collar during pulling is approximately centered on the cross section thereof, may result in an undesired buckling or bulging of the locking collar away from the stem in the region of the fastener head recess, as indicated by the dashed line 92 of FIG. 13. This of course is also undesirable, and accordingly, there is a definite limit on the depth of the tapered region 86 which may be used without encountering this problem.

One preferred form of the recess in the head of the fastener and associated region of the locking collar may be seen in FIG. 14. In particular, in this embodiment, the recess 94 in the head of the fastener is substantially deeper than the recess 72 (FIG. 12) of the first disclosed embodiment, and is also of a substantially smaller diameter. Similarly, the tapered region 96 at the bottom of the recess 94 is a somewhat deeper taper than the corresponding region 98 of the embodiment of FIG. 12, but not as deep as the embodiment of FIG. 13. In that regard, the depth of the recess 72 in the embodiment of FIG. 12 is approximately equal to the annular thickness of the locking collar 28 so that a simple flaring of the locking collar will substantially fill the recess. Obviously a thicker locking collar in the embodiment of FIG. 12 would thereby provide a deeper formed lock so that much more of the formed head would remain after shaving. However, various other parameters such as sleeve diameters and thicknesses, stem diameter requirements, etc., limit the thickness of the locking collar and thus limit the depth of the formed head which may be obtained by the simple flare of FIG. 12.

Making recess 94 of the embodiment of FIG. 14 substantially deeper than recess 72 or the embodiment of FIG. 12 is therefore not a mere matter of arbitrary choice or degree, as the deeper recess 94 substantially exceeds the thickness of the locking collar and accordingly, cannot be filled by a simple flare of the top of the locking collar thereinto. Instead substantial upsetting of the top of the locking collar must occur for the filling of the recess 94 and tapered region 96. In addition, the embodiment in FIG. 14 has the top of the locking collar shaped so that the upsetting force is not centered on the cross section of the locking collar but rather is disposed toward the outer diameter thereof, resulting in a relief 99 adjacent the stem 16. This distribution of load on the locking collar encourages a partial flare of the top thereof outward, with the combination of the flare and upsetting filling the recess 94 and the tapered region 96. As with the embodiment of FIG. 13, the initial relief in the region 99 and of course the partial flaring of the top of the locking collar during pulling allows the required upsetting to tightly fill the recess in the head of the fastener without resulting in the extrusion of any locking collar material in region 100 into any space between the stem and the anvil washer, as was illustrated with respect to FIG. 12. Thus the partial flaring, partial upsetting of the top of the locking collar during pulling which is achieved in FIG. 14 results in a deeper formed locking collar top than the simple flaring of the embodiment of FIG. 12, whereby an ample part of the formed locking collar top is retained after shaving of the installed fastener to retain a very high locking strength. At the same time the extrusion of locking collar material into any gap between the anvil washer and the stem is prevented primarily because of the extent of cold working of the locking collar in the recess material which would be required before such extrusion could start to take place, all without buckling of the locking collar in the recess which would tend to create gaps between the stem and the formed locking collar in the installed fastener. In that regard, buckling is avoided by the fact that the unsupported length of the locking collar within the recess in comparison to its thickness is still relatively short, and the partial flare of the top of the locking collar outward to engage the wall of the recess leaves both the inner diameter and outer diameter of the unsupported length of the locking collar unconstrained, whereby the locking collar will yield in compression to fill the recess as shown before buckling can occur.

Now referring to FIG. 15, a side view taken in partial cross section of an alternate form of locking collar may be seen. In this Figure, the locking collar, generally indicated by the numeral 102, is comprised of an upper locking collar portion 104 and a lower locking collar portion 106 integrally connected by region 108. The two locking collar portions 104 and 106, together with region 108, in this embodiment form a single inner diameter 110 for fitting over the stem, and a single outer diameter 112 for sliding within a cylindrical opening through the sleeve, the outer diameter 112 being interrupted only by the region 108 of a smaller outer diameter coupling the two locking collar portions. As such, the locking collar is of substantially rectangular cross-section interrupted only by the depression on the outer surface thereof defining region 108 coupling the upper and lower locking collar portions 104 and 106.

Now referring to FIG. 16, a partial cross section of a fastener utilizing the locking collar of FIG. 15 may be seen, this figure, like FIG. 5, illustrating on the left side of the center line the fastener prior to pulling and on the right side of the center line the fastener after pulling. In this figure the sleeve 10a is substantially the same as the sleeve 10 of FIG. 5, with the exception of the recess 72a being somewhat larger and deeper, as in the recess of the fastener of U.S. Pat. No. 4,012,984. Similarly the stem 16a is substantially the same as the stem 16 of the embodiment of FIG. 5 with two exceptions, namely that the locking groove 24a is somewhat shorter in axial length than the locking groove of FIG. 5, and that region 114 of the stem is knurled to retain the locking collar 102 on the stem at a position with the lower end of the locking collar against or at least adjacent the plug portion 20a of the stem.

The reason for retaining the locking collar 102 adjacent to plug portion of the stem at all times is as follows: Normally when a rivet is pulled the compressive loads on the sleeve tail will cause the same to expand outward, allowing the stem to move upward through the locking collar until a plug portion abuts the end thereof. However, in certain instances, such as in the case of sleeve eccentricities and the like, at least part of the sleeve tail may deflect inward, interfering with the free movement of the plug portion 20a of the stem through the sleeve to abut the locking collar, resulting in the pulling portion of the stem breaking off too early, resulting in an improperly set rivet requiring removal and replacement thereof. By retaining the locking collar to a position substantially abutting the plug portion 20a of the stem at all times, the space between the inner diameter of the sleeve and the stem, at least in the sleeve tail region adjacent the plug portion of the stem, is filled. Consequently, any initial tendency of the sleeve tail to move radially inward is resisted by the presence of the locking collar in that region, forcing the sleeve tail formation to thereafter proceed outward in a normal manner during pulling.

As pulling progresses, the locking collar 102 will move through the sleeve with the stem until the same abuts the anvil washer 30. At this point the compressive load on the locking collar results in yielding of the smaller cross-sectional area of region 108, causing the same to buckle inward to pack tightly into the locking groove 24a as may be seen at the right side of FIG. 16 and in FIG. 17, a view thereof taken on an expanded scale. In essence, the buckling causes the regions of both the upper and lower locking collar portions to move inward into the locking groove to pack tightly therein. In comparison to the previously described embodiment, only the corresponding region of the upper locking collar portion packed into the locking groove.

While the locking groove may take various shapes, it is of course desired that the buckling itself result in the desired packing without any substantial yielding in compression of the upper and lower locking collar portions except as may be incidental to the buckling, at least until the buckled portion of the locking collar is packed into the locking groove, as a yielding and compression of the full cross-section of the locking collar before the buckling portion is packed reasonably tightly into the locking groove will cause an increase in the cross-sectional area of the locking collar in that region, increasing the friction between the sleeve and stem and possibly causing a hangup of the locking collar on the break groove, thereby interfering with the motion of the upper locking collar portion toward the locking groove to achieve the desired extent of buckling of the locking collar into the locking groove. Accordingly, assuming the extent of the region 108 coupling the upper and lower locking collar portion only defines the position of initial buckling and does not itself fully pack the locking groove, the locking groove should have an axial extent which is on the order of, and preferably does not exceed approximately twice the radial thickness of the upper and lower locking collar portions so the same as buckled (see both the right hand side of FIG. 16 and FIG. 17) will fill the axial extent of the locking groove. In that regard the commonly used stem and locking collar materials and surface conditions are such as to prevent galling and/or seizing between the stem and adjacent surfaces of the locking collar, so that some limited extent of extrusion of the locking collar into the locking groove may be tolerated. Accordingly, one might pick a locking groove axial extent which in its upper limit does not exceed twice the thickness of the locking collar in its lower limit.

Also as may be seen in the left hand side of FIG. 16, the region 108 coupling the upper and lower locking collar portions and defining the initial region of buckling will in general have its center initially slightly closer to the pulling portion of the stem than the center of the locking groove area. This position will help pack the locking collar into the locking groove as desired. In that regard,, one way of picking a combination of configuration for the locking groove 24a and for the region 108 defining the initial buckling region is to make mocks-ups, either full size or larger for convenience, each with an artificially large locking groove, load the locking collars to provide various degrees of buckling, and then section the resulting locking collars so that the history of deformation through buckling may be determined. Obviously, though the lock groove need not faithfully reproduces this form of buckling, it preferably will be selected to be compatible with the natural buckling which is obtained. Further of course, while the shape of the locking groove as well as region 108 may be varied as desired, preferably the cross sections of the locking groove and of region 108 will be kept relatively simple to facilitate both manufacture and inspection, as the actual parts normally are quite small, making complicated geometries quite difficult to control. However, it should be noted that, while by way of example, region 108 is showed in FIG. 16 as a depression formed by a circular arc, other shapes of depressions may also be used, such as by way of example, "V" shaped depressions having straight sidewalls, convex sidewalls or concave sidewalls as desired. Also of course, neither the locking groove 24a nor the depression 108 in the locking collar 102 needs to be actually symmetrical, as non-symmetrical configurations, particularly for the locking groove, may better accommodate the buckling to easily and efficiently tightly pack the locking collar therein. Further, the locking groove 24a need not abut the plug portion 20a but may be spaced along the stem therefrom, though it is preferable to have the locking groove 24a abut the plug portion to prevent the locking groove from pulling up into the region of the recess 72a in the head of the sleeve when pulling the rivet under the minimum grip conditions.

The net result of the configuration of FIGS. 15 through 17 is that both the upper and lower locking collar portions adjacent the region integrally coupling the same pack tightly into the locking groove in comparison to the hereinbefore described embodiment, wherein only the corresponding region of the upper locking collar portion packed tightly into the locking groove. Obviously as pulling progresses, once the locking collar has formed in the locking groove, the upper locking collar portion will yield in compression, packing tightly between the stem and sleeve, ultimately buckling outward to fill the recess in the head end of the sleeve in the same manner as the head end of the locking collar of the blind rivet assembly of U.S. Pat. No. 4,012,984.

Thus, it will be obvious to those skilled in the art that these and various other changes may readily be made in the invention disclosed herein without departing from the spirit in scope of the invention.

We claim:

1. In a blind rivet assembly having:
   a tubular rivet sleeve having a cylindrical opening therethrough, a preformed head at one end and an expandable sleeve tail on the other end thereof,
   a stem extending through said sleeve and said head,
   a tail former at the tail end of the stem adjacent said sleeve tail for expanding said tail,
   a pulling portion on a pulling end of the stem adapted to be engaged by a tool for pulling the stem,
   a plug portion of the stem adjacent said tail former,
   a locking groove in the stem adjacent said plug portion,
   the portion of the stem between said locking groove and said pulling portion being of smaller diameter than the interior diameter of said sleeve and head, and said plug portion of the stem being approximately equal in diameter to the cylindrical opening through the rivet sleeve.
   the improvement comprising a locking collar positioned over said stem and within the cylindrical opening of said tubular rivet sleeve between said plug portion and said pulling portion, said locking collar prior to pulling having a body portion having a first locking collar portion and a second locking collar portion, said first locking collar portion having an outer diameter slideable within said cylindrical opening in said tubular rivet sleeve and being slideable along said stem to abut said plug portion of said stem, said second locking collar portion having an outer diameter also slideable within said cylindrical opening in said tubular rivet sleeve and an inner diameter slideable along said stem, the region of said first locking collar portion adjacent said second locking collar portion and the region of said second locking collar portion adjacent said first locking collar portion being cooperatively shaped to deform, relative to said first locking collar portion, the region of said second locking collar portion adjacent said first locking collar portion tightly into said locking groove during pulling when said first locking collar portion is restricted to movement with said stem by engagement with said plug portion.

2. The improvement of claim 1 wherein said first and second locking collar portions are integrally connected, whereby said locking collar is a one piece locking collar prior to pulling.

3. The improvement of claim 1 wherein said second locking collar portion opposite said first locking collar portion has deformable end integrally coupled thereto with an internal relief whereby forceful engagement of the deformable end with a surface substantially perpendicular with the axis of said blind rivet assembly will cause said deformable end portion to flare in the region of said relief.

4. The improvement of claim 3 wherein said internal relief comprises a tapered relief.

5. The improvement of claim 1 wherein said region of said first locking collar portion adjacent said second locking collar portion has an internal taper and said region of said second locking collar portion adjacent said first locking collar portion has an external taper, said tapers cooperatively acting to deform the region of said second locking collar portion adjacent said first locking collar portion tightly into said locking groove during pulling.

6. In a blind rivet assembly having
a tubular rivet sleeve having a cylindrical opening therethrough, a preformed head at one end and an expandable sleeve tail on the other end thereof,
a stem extending through said sleeve and said head,
a tail former at the tail end of the stem adjacent said sleeve tail for expanding said tail,
a pulling portion on the pulling end of the stem adapted to be engaged by a tool for pulling the stem,
a plug portion of the stem adjacent said tail former,
a locking groove in the stem adjacent said plug portion,
the portion of the stem between said locking groove and said pulling portion being of smaller diameter than the interior diameter of said sleeve and head, and said plug portion of the stem being approximately equal in diameter to the cylindrical opening through the rivet sleeve.
a locking collar positioned over said stem and within the cylindrical opening of said tubular rivet sleeve between said plug portion and said pulling portion, said locking collar prior to pulling having a body portion having a first locking collar portion and a second locking collar portion, said first locking collar portion having an outer diameter slideable within said cylindrical opening in said tubular rivet sleeve and being slideable along said stem to abut said plug portion of said stem, said second locking collar portion having an outer diameter also slideable within said cylindrical opening in said tubular rivet sleeve and an inner diameter slideable along said stem, the region of said first locking collar portion adjacent said second locking collar portion and the region of said second locking collar portion adjacent said first locking collar portion being cooperatively shaped to deform, relative to said first locking collar portion, the region of said second locking collar portion adjacent said first locking collar portion tightly into said locking groove during pulling when said first locking collar portion is restricted to movement with said stem by engagement with said plug portion.

7. A locking collar for a rivet of the type having a tubular sleeve having an internal diameter defining a cylindrical opening therethough, a preformed head at one end thereof, and a stem passing through the sleeve, the stem having a first diameter adjacent the preformed head end of the sleeve which is smaller than the internal diameter of the sleeve, a plug portion having a second diameter substantially equal to the internal diameter of the sleeve adjacent the end of the sleeve opposite the head, and a locking groove therebetween, the rivet being set by the pulling of the stem with respect to the sleeve along the axis of the rivet from the end of the stem opposite the plug portion thereof;
said locking collar having a substantially tubular body portion having a substantially uniform inner diameter to fit over the first diameter of the stem and a subtantially uniform outer diameter to fit within the sleeve, and first and second locking collar ends perpendicular to the axis thereof, said first end for abutting the plug portion of the stem when setting the rivet, said locking collar having a region of reduced compressive strength between said first and second ends thereof separating first and second locking portions, respectively, whereby a sufficient longitudinal compressive load between said first and second ends of said locking collar will cause yielding in said region of reduced compressive strength resulting in movement of the second locking collar portion adjacent said first locking collar portion, said region of reduced compressive strength being configured to deflect the region of said second locking collar portion adjacent said first locking collar portion inward with respect thereto, whereby said locking collar will substantially fill the locking groove in the stem during setting of the rivet.

8. The locking collar of claim 7 wherein said second end of said locking collar has an internal relief, whereby said second end will flare when subjected to a sufficient compressive load applied substantially along the axis thereof.

9. The locking colllar of claim 8 wherein said internal relief comprises a tapered relief.

10. The locking collar of claim 8 wherein said locking collar in regions other than the region of said internal relief and the region of reduced compressive strength is substantially tubular having an outer diameter corresponding to said sleeve internal diameter and an inner diameter corresponding to said stem first diameter.

11. The locking collar of claim 10 wherein said internal relief comprises a tapered relief of at least 50% of the thickness of said tubular section.

12. In a blind rivet assembly having:
a tubular rivet sleeve having a preformed head at one end and an expandable sleeve tail on the other end thereof,
a stem extending through said sleeve and said head,
a tail former at the tail end of the stem adjacent said sleeve tail for expanding said tail,
a pulling portion on the pulling end of the stem adapted to be engaged by a tool for pulling the stem,
a plug portion of the stem adjacent said tail former,
a locking groove in the stem adjacent said plug portion,
the portion of the stem between said locking groove and said pulling portion being of smaller diameter than the interior diameter of said sleeve and head,
the improvemnt comprising
a locking collar positioned on said stem between said plug portion and said pulling portion for extending inward into said locking groove and outward into a recess in said preformed head to retain the stem in the pulled position upon pulling of the rivet, said locking collar having a tubular section with an internal relief at the end thereof facing said pulling portion of said stem, whereby compressive loads on said end of said locking collar facing said pulling portion of said stem during pulling will cause said end to flare into said recess in said preformed head.

13. The locking collar of claim 12 wherein said internal relief is tapered relief.

14. The locking collar of claim 12 wherein said internal relief comprises a tapered relief of at least 50% of the thickness of said tubular section.

15. In a blind rivet assembly having:
a tubular rivet sleeve having a preformed head at one end and an expandable sleeve tail on the other end thereof,
a stem extending through said sleeve and said head,
a tail former at the tail end of the stem adjacent said sleeve tail for expanding said tail,
a pulling portion on the pulling end of the stem adapted to be engaged by a tool for pulling the stem,
a plug portion of the stem adjacent said tail former,
a locking groove in the stem adjacent said plug portion,
the portion of the stem between said locking groove and said pulling portion being of smaller diameter than the interior diameter of said sleeve and head,
the improvement comprising
a locking collar positioned on said stem between said plug portion and said pulling portion for extending inward into said locking groove and outward into a recess in said preformed head to retain the stem in the pulled position upon pulling of the rivet, said locking collar having first and second locking collar portions and a tubular section with an internal relief at the end thereof facing said pulling portion of said stem, said recess having a diameter larger than the inner diameter of said tubular rivet sleeve and deeper than the radial thickness of said locking collar, whereby forceful engagement to the end of said second locking collar portion having said internal relief with a surface substantially perpendicular with the axis of said blind rivet assembly will cause, as pulling progresses, said second locking collar portion to partially flare outward in the region of said relief, and to thereafter yield in compression to substantially fill said annular recess in said preformed head.

16. The improvement of claim 15 wherein the diameter of said recess limits the extent of the partial flare of said second locking collar portion during pulling.

17. In a blind rivet assembly having:
a tubular rivet sleeve having a cylindrical opening therethrough, and an expandable sleeve tail on the other end thereof,
a stem extending through said sleeve and said head,
a tail former at the tail end of the stem adjacent said sleeve tail for expanding said tail,
a pulling portion on a pulling end of the stem adapted to be engaged by a tool for pulling the stem,
a plug portion of the stem adjacent said tail former,
a locking groove in the stem adjacent said plug portion,
the portion of the stem between said locking groove and said pulling portion being of smaller diameter than the interior diameter of said sleeve and head,
the improvement comprising
a locking collar positioned over said stem and within the cylindrical opening of said tubular rivet sleeve between said plug portion and said pulling portion, said locking collar having a body portion defining an inner diameter to slide over the portion of said stem between said locking groove and said pulling portion, and an outer diameter to slide within said interior diameter of said sleeve, said body portion having a first locking collar portion and a second locking collar portion, said first locking collar portion having an outer diameter slidable within said cylindrical opening in said tubular rivet sleeve and being slidable along said stem to abut said plug portion of said stem, said second locking collar portion having an outer diameter also slideable within said cylindrical opening in said tubular rivet sleeve and an inner diameter slideable along said stem, the region of said first locking collar portion adjacent said second locking collar portion and the region of said second locking collar portion adjacent said first locking collar portion being cooperatively shaped to deform, relative to said first locking collar portion, the region of said second locking collar portion adjacent said first locking collar portion tightly into said locking groove during pulling when said first locking collar portion is restricted to movement with said stem by engagement with said plug portion,
wherein said preformed head of said rivet sleeve has an annular recess in the face thereof a diameter larger than the inner diameter of said tubular rivet sleeve and deeper than the radial thickness of said locking collar, and wherein the end of said second locking collar portion opposite said first locking collar portion has an internal relief whereby forceful engagement of the end of said locking collar portion having said internal relief with a surface substantially prependiculär with the axis of said blind rivet assembly will cause, as pulling progresses, said second locking collar portion to partially flare outward in the region of said relief, and to thereafter yield in compression to substantially fill said annular recess in said performed head.

18. The inprovement of claim 17 wherein the diameter of said annular recess limits the extent of the partial flare of said second locking collar portion during pulling.

19. In a blind rivet assembly having
a tubular rivet sleeve having a cylindrical opening therethrough, a preformed head of one end and an expandable sleeve tail on the other end thereof,
a stem extending through said sleeve and said head,
a tail former at the tail end of the stem adjacent said sleeve tail for expanding said tail,
a pulling portion on a pulling end of the stem adapted to be engaged by a tool for pulling the stem,
a plug portion of the stem adjacent said tail former,
a locking groove in the stem adjacent said plug portion,
the portion of the stem between said locking groove and said pulling portion being of smaller diameter than the interior diameter of said sleeve and head, and said plug portion of the stem being approximately equal in diameter to the cylindrical opening through the rivet sleeve,
the improvement comprising
a locking collar having an inner diameter positioned over said stem and within the cylindrical opening of said tubular rivet sleeve between said plug portion and said pulling portion, said locking collar prior to pulling having a body portion having integral first and second locking collar portions, said first locking collar portion having an outer diameter slideable within said cylindrical opening in said tubular rivet sleeve and being slideable along said stem to abut said plug portion of said stem, and said second locking collar portion having an outer diameter also slideable within said cylindrical opening in said tubular rivet sleeve and an inner diameter slideable along said stem, the region coupling said first locking collar portion and said second locking collar portion being shaped to deform at least the region of said second locking collar portion adjacent said first locking collar portion tightly into said locking groove during pulling when said first locking collar portion is restricted to movement with said stem by engagement with said plug portion.

20. The improvement of claim 19 further comprised of means for restricting said locking collar prior to pulling to a position relative to said stem whereby said first locking collar portion is at least close to abutting said plug portion.

21. The improvement of claim 19 wherein the region coupling said first locking collar portion and said second locking collar portion is shaped to deform the region of said second locking portion adjacent said first locking collar portion, and not the region of said first locking collar portion adjacent said second locking collar portion, tightly into said locking groove during pulling.

22. The improvement of claim 19 wherein the region coupling said first locking collar portion and said second locking collar portion is located on said locking collar so as to be positioned closer to said preformed head of said tubular rivet sleeve than said locking groove in said stem when said first locking collar portion is abutting said plug portion, and is shaped to deform both the region of said second locking portion adjacent said first locking collar portion and the region of said first locking collar portion adjacent said second locking collar portion tightly into said locking groove during pulling.

23. The improvement of claim 22 wherein said region coupling said first and second locking collar portions has an inner diameter substantially equal to the inner diameter of said first and second locking collar portions and an outer diameter substantially less than the outer diameter of said first and second locking collar portions, whereby said locking collar will buckle in the region coupling said first and second locking collar portions into the adjacent locking groove in said stem upon loading the locking collar in compression during pulling.

24. A blind rivet assembly having
 a tubular rivet sleeve having a cylindrical opening therethrough, a preformed head at one end and an expandable sleeve tail on the other end thereof,
 a stem extending through said sleeve and said head,
 a tail former at the tail end of the stem adjacent said sleeve tail for expanding said tail,
 a pulling portion on a pulling end of the stem adapted to be engaged by a tool for pulling the stem,
 a plug portion of the stem adjacent said tail former,
 a locking groove in the stem adjacent said plug portion,
 the portion of the stem between said locking groove and said pulling portion being of smaller diameter than the interior diameter of said sleeve and head, and said plug portion of the stem being approximately equal in diameter to the cylindrical opening through the rivet sleeve,
 a locking collar positioned over said stem and within the cylindrical opening of said tubular rivet sleeve between said plug portion and said pulling portion, said locking collar prior to pulling having a body portion having integral first and second locking collar portions coupled by a buckling region, said first locking collar portion having an outer diameter slideable within said cylindrical opening in said tubular rivet sleeve and being slideable along said stem to abut said plug portion of said stem, second locking collar portion having an outer diameter also slideable within said cylindrical opening in said tubular rivet sleeve and an inner diameter slideable along said stem, said buckling region coupling said first locking collar portion and said second locking collar portion being located on said locking collar so as to be positioned closer to said preformed head of said tubular rivet sleeve than said locking groove in said stem when said first locking collar portion is abutting said plug portion, said buckling region being shaped to buckle and deform said locking collar tightly into said locking groove during pulling when said first locking collar portion is restricted to movement with said stem by engagement with said plug portion.

25. The assembly of claim 24 further comprised of means for restricting said locking collar prior to pulling to a position relative to said stem whereby said first locking collar portion is at least close to abutting said plug portion.

26. The assembly of claim 24 wherein said buckling region coupling said first and second locking collar portions has an inner diameter substantially equal to the inner diameter of said first and second locking collar portions and an outer diameter substantially less than the outer diameter of said first and second locking collar portions.

27. The assembly of claim 24 wherein said locking collar has a cross section which is substantially rectangular, interupted by a relief in the side of the outer diameter of said locking collar defining said buckling region coupling said first and second locking collar portions.

28. The assembly of claim 27 wherein the length of said locking groove along said stem does not exceed approximately twice the thickness of said rectangular cross section of said locking collar.

* * * * *